Dec. 26, 1933.    E. L. KRAFT    1,941,176
WINDSHIELD FOR AUTOMOBILES
Filed Sept. 2, 1931    2 Sheets-Sheet 2
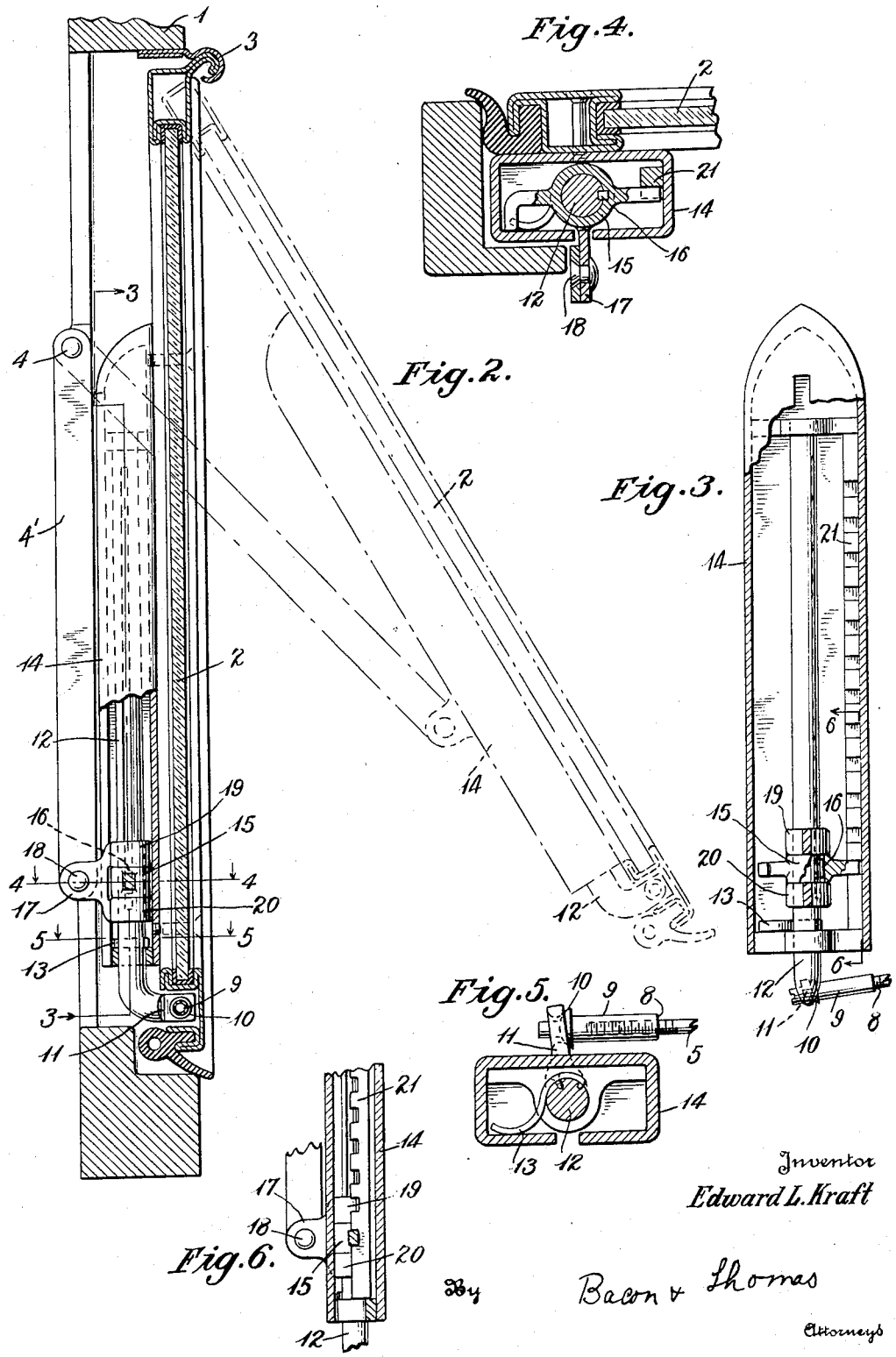
Inventor
Edward L. Kraft
By Bacon & Thomas
Attorneys Patented Dec. 26, 1933

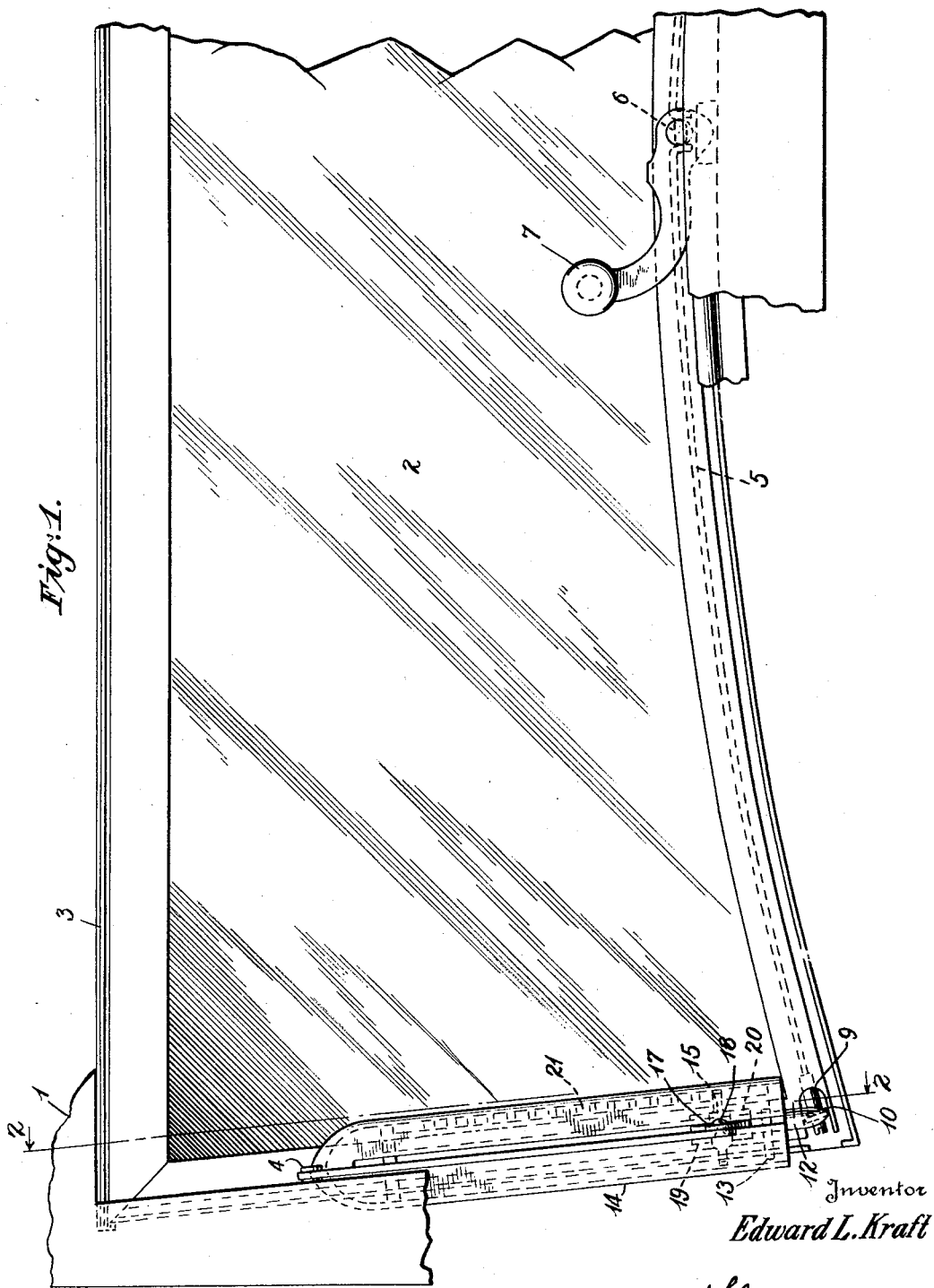

1,941,176

UNITED STATES PATENT OFFICE 1,941,176

WINDSHIELD FOR AUTOMOBILES

Edward L. Kraft, York, Pa., assignor to Martin-Parry Corporation, York, Pa., a corporation of Delaware Application September 2, 1931. Serial No. 560,809

6 Claims. (Cl. 296—84)

This invention relates to windshield controlling mechanism of the "mono-control" type and constitutes an improvement upon the general idea disclosed and broadly claimed in the Beitman application Serial No. 386,780, filed August 19, 1929.

The present invention relates particularly to a positive latching mechanism controlled by a conveniently located handle for fixing the shield positively in its adjusted position.

Further objects of the invention will be apparent to those skilled in the art from a reading of the following specification in conjunction with the drawings attached hereto and forming a part hereof in which Fig. 1 represents an elevation of a portion of the shield showing in a general way the controlling mechanism and the securing mechanism;

Fig. 2 is a longitudinal sectional view taken on line 2—2 of Fig. 1;

Fig. 3 is a detail view of the latching mechanism taken on line 3—3 of Fig. 2;

Fig. 4 is a cross sectional view on line 4—4 of Fig. 2;

Fig. 5 is a detail sectional view of the connection between the controlling mechanism and the latch taken on line 5—5 of Fig. 2; and Fig. 6 is another detail sectional view of the rack and the latch therefor.

Referring now particularly to the drawings, 1 represents the conventional stationary windshield frame which may be of any desired construction; 2 represents a swinging shield secured to the windshield frame by a piano hinge 3. A bracing arm may be secured to one or both sides of the windshield frame as at 4 for pivotal movement relative thereto. Housed within the lower marginal part of the windshield are push rods 5 which may be spread apart by the cam 6 actuated by the handle 7. The outer ends of the push rods 5 are adjustably connected as at 8 to a device 9 which in turn is secured as at 10 to a bell crank lever 11 which is secured to the locking rod 12 to impart rotary movement thereto against the tension, in one direction, of the spring 13 conveniently located in the housing 14, which housing is secured in any desired manner to the windshield 2.

The numeral 15 represents a rocking latch element which has a cylinder splined to the locking rod as at 16 for relative vertical movement with respect thereto with a purpose hereinafter described. A connecting lever 17 is pivoted as at 18 to the bracing arm 4' and is provided with two spaced sleeves 19 and 20 which are freely slidable and rotatable on the locking rod 12 in accordance with the movements of the shield.

Within the housing is provided a vertically disposed rack 21 having a series of closely spaced teeth and into which the latch bar 15 fits when in locked position.

In the operation of the device, the driver may with one hand turn the handle 7 to thereby actuate the push rods 5 to spread the same and to impart a rotary movement to the locking rod 12. Due to the fact that the locking rod 12 has slidably keyed thereto the latch 15 such rotary movement imparts a corresponding movement to the latch and thereby forces the same into engagement with the rack against the tension of the spring 13. In that condition the shield is maintained in its adjusted position. To close or to effect a further adjustment, the control handle is moved in another direction which causes the rocking latch to move out of engagement with the rack to clear the same and thereafter the latch and the connecting lever 17 may freely slide in consonance with the movements of the shield to the position where it is desired to maintain the shield. It is to be observed that the handle 7 in addition to functioning as a controlling handle may be also used as a push lever so that the operator may simultaneously release the latch from the rack and push the shield outwardly.

Having thus described my invention what I claim is as follows:

1. In combination, a windshield frame, a windshield swingingly mounted therein, a control mechanism for fixing the shield in its adjusted position, said control mechanism comprising a housing secured to the windshield and movable therewith, a vertically disposed rod located within the housing, a rocking latch splined to the rod for free vertical movement thereon, a rack located within the housing for engagement with the latch to restrain the sliding action thereof, bracing means, a connection between the bracing means and said rod permitting sliding action with the latch when in disengaged position, a handle and connections associated therewith for rotating the rod and the latch secured thereto whereby the latch may be caused to engage or disengage the rack at the will of the operator thereby to control the sliding action between the bracing means and the rod and maintain the shield in its desired position of adjustment.

2. In combination, a windshield frame, a windshield swingingly mounted therein, bracing means for said shield hinged at one end of the frame and slidably connected at the other end to the windshield in accordance with the movements of the shield, a locking rod, a slidable connection between the bracing means and the locking rod, said locking rod being secured to the windshield, means for rotating said locking rod, a rocking latch secured to the rod, a rack into which the latch moves, and means for rotating said locking rod and said latch into engagement with the rack whereby to prevent or permit sliding action of said bracing means relative to the shield.

3. In combination, a windshield frame, a windshield swingingly mounted therein, a bracing device, a guiding element for the bracing device, a rotating locking rod, said guiding element being slidably disposed on said rod during the various open positions of the shield, means for restraining said sliding movement, said means comprising a rotating latch secured to the locking rod and a rack bar cooperating therewith, and means for rotating said rod whereby to fix the latch in any desired position of adjustment of the shield.

4. In combination, a windshield frame, a windshield swingingly mounted therein, a bracing device, a housing carried by the shield, a locking rod mounted therein, a latch operated by the locking rod, a rack spaced from and parallel with the rod to engage the latch, a connection between the bracing device and the rod permitting relative sliding action therebetween when the shield is undergoing adjustment, a handle, and a connection between the handle and the locking rod for actuating said latch to secure the shield in any determined position of adjustment.

5. In combination, a windshield frame, a windshield mounted for outward swinging movement therein, bracing means secured to the frame, a housing attached to the windshield, a locking rod rotatably mounted therein, a latch slidably keyed on the rod, a rack spaced from the rod for engaging the latch, a control handle, a connection between the control handle and the locking rod whereby movement of the handle actuates the rod and turns the latch into engagement with the rack, and a lever secured to the bracing means to slide on said locking rod and limited in its sliding movement by said latch when engaging said rack.

6. In combination, a windshield frame, a windshield swingingly mounted therein, means for securing said windshield in adjusted position, said means comprising a bracing device, a jointly rotatable locking rod and latch carried by the windshield, a rack spaced from the rod for engagement with the latch, means secured to the windshield for rotating the locking rod and the latch to cause the latter to engage with the rack to prevent relative movement between the bracing device and the windshield.

EDWARD L. KRAFT.